United States Patent [19]

Blanchard

[11] 4,395,240
[45] Jul. 26, 1983

[54] MARINE PROPULSION LOWER UNIT WITH BALL CLUTCH MECHANISM

[75] Inventor: Clarence E. Blanchard, Kenosha, Wis.

[73] Assignee: Ourboard Marine Corporation, Waukegan, Ill.

[21] Appl. No.: 222,589

[22] Filed: Jan. 5, 1981

[51] Int. Cl.³ ............................................ B63H 23/08
[52] U.S. Cl. ...................................... 440/86; 74/371; 74/372
[58] Field of Search ................... 74/371, 372; 192/71, 192/96, 21, 51, 48, 91; 440/86

[56] References Cited

U.S. PATENT DOCUMENTS

| | | | |
|---|---|---|---|
| 796,743 | 8/1905 | Marshall | 74/360 |
| 1,015,254 | 1/1912 | Whisler | 74/372 |
| 1,102,427 | 7/1914 | Morgan | 74/372 |
| 1,434,970 | 11/1922 | Taylor | 192/74 |
| 2,474,789 | 6/1949 | Perhacs | 192/48.9 |
| 2,592,982 | 4/1952 | Violet | 74/372 |
| 2,861,461 | 11/1958 | Kreibler | 74/371 |
| 3,556,041 | 1/1971 | Shimanckas | 440/86 |
| 4,118,996 | 10/1978 | Eichinger | 192/21 |
| 4,292,855 | 10/1981 | Murayama | 74/371 |

*Primary Examiner*—Charles E. Frankfort
*Assistant Examiner*—C. T. Bartz

*Attorney, Agent, or Firm*—Michael, Best & Friedrich

[57] ABSTRACT

Disclosed herein is a marine propulsion device comprising a propeller shaft supported in a lower unit against axial movement and for rotary movement relative to the lower unit and including an axial bore extending from one end of the shaft, which bore defines an annular wall including first and second axially spaced series of circumferentially spaced cylindrical apertures communicating with the bore and having radially extending axes, respective balls in each of the apertures, first and second axially spaced facing bevel gears mounted in the lower unit co-axially with the propeller shaft for rotation relative to lower unit and propeller shaft and against axial movement relative to the lower unit and the propeller shaft, which first and second bevel gears include respective axial bores having therein respective first and second series of circumferentially spaced sockets opening radially inwardly and located in axial alignment with the first and second series of apertures in the propeller shaft, and an actuator extending in the axial bore and movable between axially spaced forward drive, neutral, and reverse drive positions, which actuator is operable to selectively engage the balls with the bevel gears to selectively establish the device in forward drive, neutral, and reverse drive conditions.

14 Claims, 8 Drawing Figures

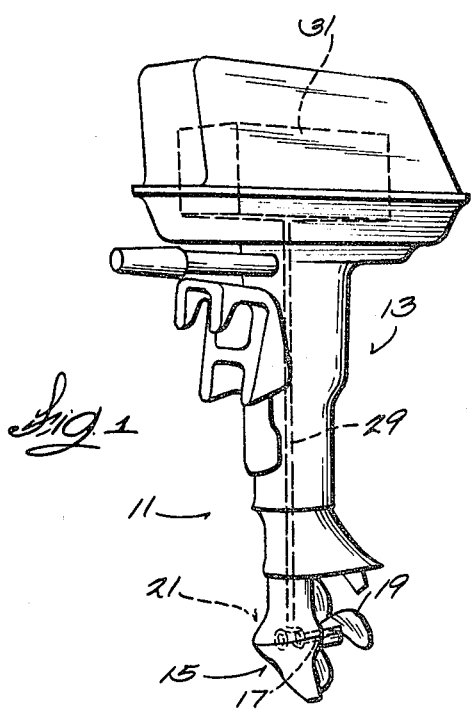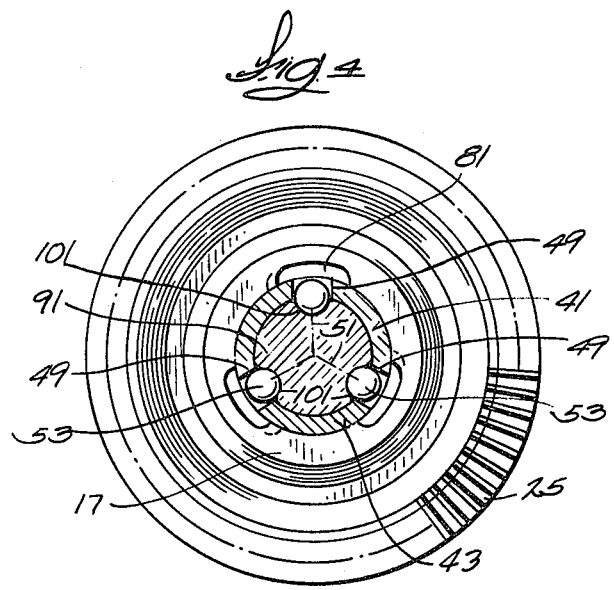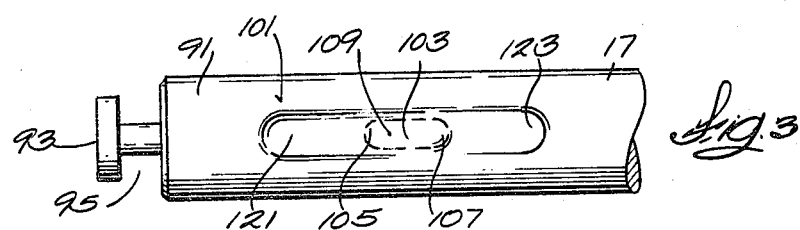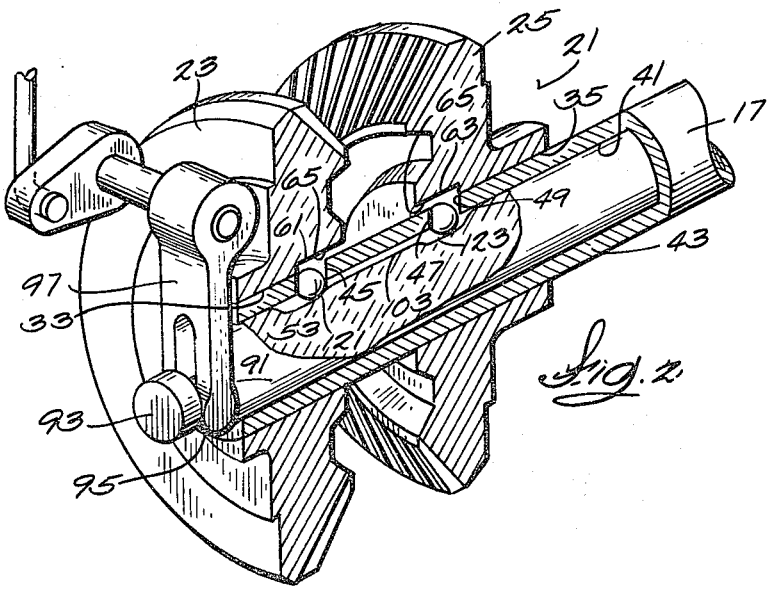

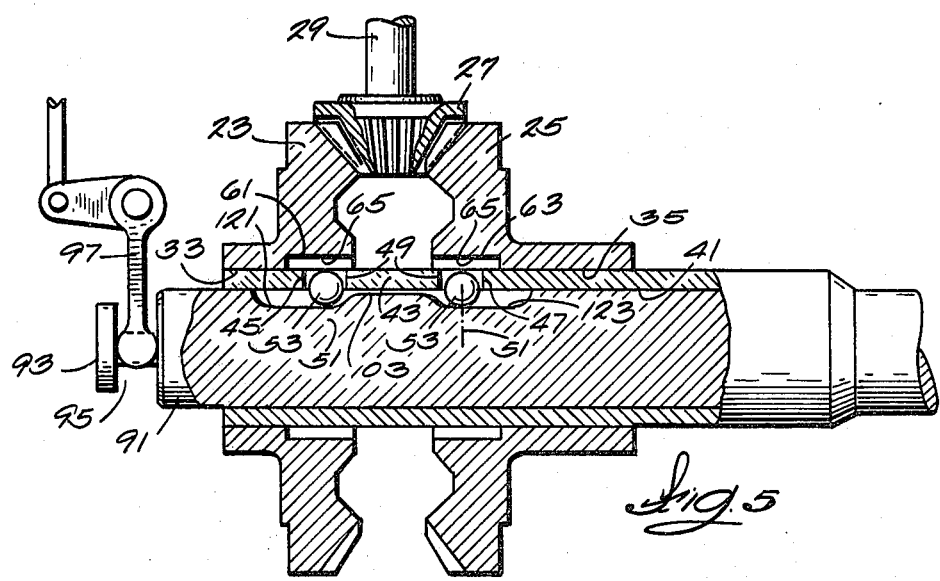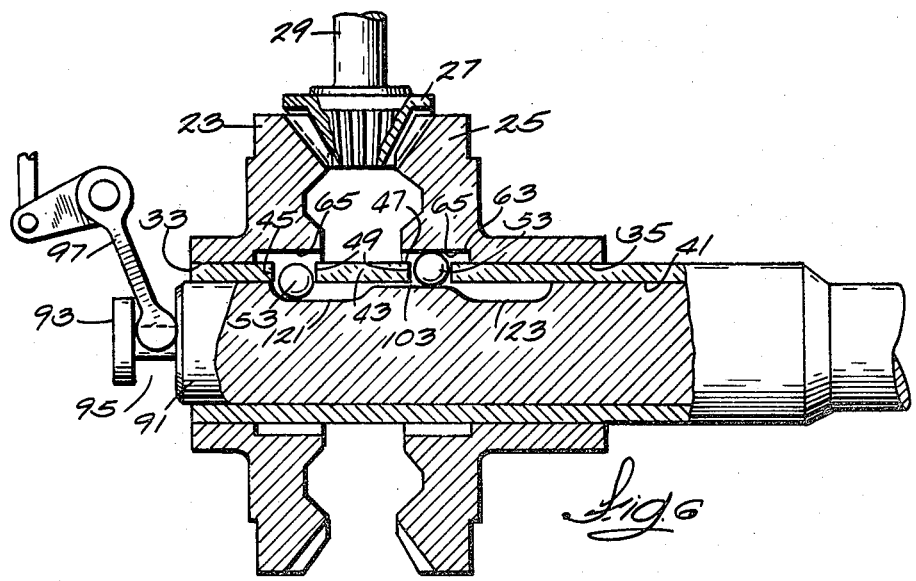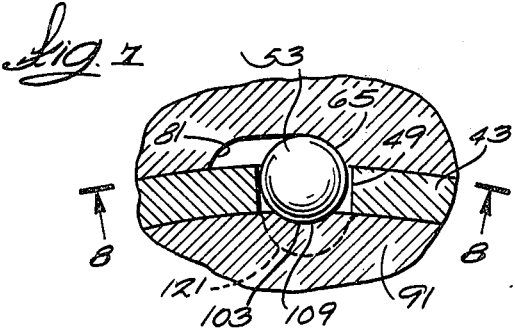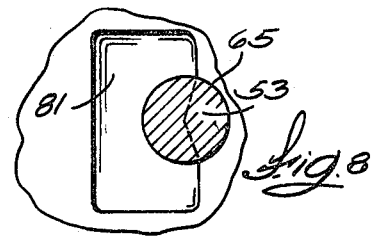

4,395,240

MARINE PROPULSION LOWER UNIT WITH BALL CLUTCH MECHANISM

BACKGROUND OF THE INVENTION

The invention relates generally to marine propulsion devices, such as outboard motors and stern drive units, and particularly to transmissions included in the gear case section of the lower units of such marine propulsion devices.

Attention is directed to the U.S. Marshall Pat. No. 796,748 issued Aug. 8, 1905, to the U.S. Taylor Pat. No. 1,434,970 issued Nov. 7, 1922, and to the U.S. Perhacs Pat. No. 2,474,789 issued June 28, 1949.

SUMMARY OF THE INVENTION

The invention provides a marine propulsion device comprising a lower unit including a propeller shaft supported in the lower unit against axial movement and for rotary movement relative to the lower unit and including an axial bore extending from one end of the shaft, which axial bore defines and defining an annular wall including first and second axially spaced series of circumferentially spaced cylindrical apertures communicating with the bore and having radially extending axes, a propulsion element fixed on the propeller shaft for common rotation therewith, respective balls in each of the apertures, first and second axially spaced facing bevel gears mounted in the lower unit co-axially with the propeller shaft for rotation relative to the lower unit and the propeller shaft and against axial movement relative to the lower unit and the propeller shaft, which first and second bevel gears include respective axial bores having therein respective first and second series of circumferentially spaced sockets opening radially inwardly and located in axial alignment with the first and second series of apertures in the propeller shaft, and an actuator extending in the axial bore and movable between axially spaced forward drive, neutral, and reverse drive positions, which actuator includes means for selectively engaging the balls with the bevel gears to selectively establish the device in forward drive, neutral, and reverse drive conditions, which means comprises a series of circumferentially spaced, axially extending grooves in the actuator, each of said grooves including a raised central portion having first and second ends axially spaced at a distance less than the axial spacing of the first and second series of apertures and having, intermediate the ends, a concave cross sectional contour with a part thereof having a common radius equal to that of the balls such that engagement of the part with an associated one of the balls forces the associated ball radially outwardly relative to the associated aperture in the propeller shaft, and into engagement with an associated socket in one of the bevel gears, each of the grooves further including first and second end portions extending respectively from the first and second ends of the central portion, each of said end portions having a cross sectional contour of such dimension as to permit receipt thereinto of an associated ball so as to permit withdrawal of the associated ball from an associated socket, the end portions of the grooves having respective axial extents such that, when the actuator is in the forward drive position, the first series of apertures is axially aligned with the central portions of the grooves and the second series of apertures is axially aligned with the second end portions of the grooves, whereby rotary drive is established between the first bevel gear and the propeller shaft and rotary drive is disengaged between the second bevel gear and the propeller shaft, such that, when the actuator is in the neutral position, the first and second series of apertures are respectively axially aligned with the first and second end portions of the grooves and the central portions of the grooves are located intermediate the first and second series of apertures, whereby both of the bevel gears are disengaged from rotary drive with the propeller shaft, and such that, when the actuator is in the reverse drive position, the second series of apertures is axially aligned with the central portions of the grooves and the first series of apertures is axially aligned with the first end portions of the grooves, whereby rotary drive is established between the second bevel gear and the propeller shaft and rotary drive is disengaged between the first bevel gear and the propeller shaft.

In one embodiment of the invention, the annular wall defines a propeller shaft sleeve portion having a given radial thickness, and the balls have diameters equal to the diameters of the apertures and greater than the radial thickness of the sleeve portion of the propeller shaft.

In one embodiment of the invention, the radial thickness of the sleeve portion of the propeller shaft is greater than the maximum radial displacement of the balls, and the balls each have a diameter extending perpendicularly to the radial axis of the apertures, and the grooves are dimensioned such that the ball diameters are retained in the apertures throughout the extent of the radial movement of the balls.

In one embodiment of the invention, each of the sockets comprises a spherical surface bounded on two sides by intersecting straight lines located in angularly related planes extending through the center of the spherical surface and by an arcuate line connecting the straight lines remotely from the point of intersection.

In one embodiment of the invention, the first and second bores also include radially inwardly open pockets extending from the sockets in the direction opposite from the direction of rotation of the bevel gears.

In one embodiment of the invention, the intersecting straight lines define a point directed in the direction opposite to the direction of rotation of the associated one of the bevel gears.

Other features and advantages of the embodiments of the invention will become known by reference to the following general description, claims and appended drawings.

IN THE DRAWINGS

FIG. 1 is a perspective view of an outboard motor embodying various of the features of the invention.

FIG. 2 is an enlarged perspective view, partially broken away and in section, of a reversing mechanism incorporated in the outboard motor shown in FIG. 1.

FIG. 3 is an enlarged view, with parts omitted, of a portion of the reversing transmission shown in FIG. 2.

FIG. 4 is a sectional view of the reversing transmission shown in FIG. 2.

FIG. 5 is an axial sectional view of the reversing transmission shown in FIG. 2 with the components shown in the neutral position.

FIG. 6 is a view similar to FIG. 5 with the reversing transmission components shown in a drive condition.

FIG. 7 is an enlarged fragmentary sectional view of a portion of the reversing transmission shown in FIG. 4.

FIG. 8 is a fragmentary view taken along line 8—8 of FIG. 7.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a lower unit 11 of a marine propulsion device 13, which lower unit 11 includes a gear case 15 supporting a propeller shaft 17 for rotary movement and against axial movement. Fixed on the propeller shaft 17 for common rotation therewith is a propulsion element in the form of a propeller 19.

The gear case 15 also includes (see especially FIG. 2) a reversing transmission 21 which additionally includes first and second axially spaced, facing bevel gears 23 and 25, each of which is in meshing engagement with (see FIG. 5) a drive bevel gear 27 mounted at the lower end of a drive shaft 29 connected to a prime mover, such as an internal combustion engine 31. The first and second axially spaced bevel gears 23 and 25 are supported for rotation by the gear case 15 co-axially with the propeller shaft 17 and against axial movement relative to the propeller shaft 17 and to the gear case 15 by any suitable bearing means (not shown). The bevel gears 23 and 25 include respective inner bores 33 and 35 closely surrounding the propeller shaft 17.

The reversing transmission 21 also includes means for selectively connecting and disconnecting the first and second bevel gears 23 and 25 with the propeller shaft 17 so as to provide forward drive, neutral, and reverse drive conditions.

More specifically, the reversing transmission 21 includes a bore 41 which extends axially from the forward end of the propeller shaft 17 and which defines a propeller shaft sleeve portion 43 defined by an annular wall having a given uniform radial thickness.

The reversing transmission 21 also includes, in the sleeve portion 43 of the propeller shaft 17, axially spaced, first and second series 45 and 47 of circumferentially spaced cylindrical apertures 49 having radially extending axes 51, which apertures 49 communicate with the axial bore 41. In the specifically disclosed construction, each of the series 45 and 47 includes three apertures 49 which are equiangularly spaced at 120° from each other. If desired, each of the series 45 and 47 can include a lesser number of apertures 49 than three or a greater number of apertures 49 than three.

The reversing transmission 21 also includes respective balls 53 located in the apertures 49, which balls 53 have a diameter which is about 133 percent of the radial thickness of the propeller shaft sleeve portion 43. Of course, the invention is not limited to a ball diameter of 133 percent of the radial thickness of the sleeve portion 43 so long as the radial thickness of the sleeve portion 43 is less than the ball diameter and otherwise accommodates radial movement of the balls 58 into and out of engagement with the bevel gears 23 and 25 as will hereinafter be further disclosed.

The reversing transmission 21 further includes a first and a second series 61 and 63 of sockets 65 provided respectively in the first and second bevel gears 23 and 25 in respective axial alignment with the first and second series 45 and 47 of apertures 49 in the propeller shaft sleeve portion 43. Each of the series 61 and 63 of sockets 65 includes a number of sockets equal to the number of apertures in the associated series 45 and 47 of apertures 47.

As shown in FIGS. 7 and 8, each socket 65 comprises a sector of a sphere having a radius equal to the radius of the balls 53. In addition, each socket 65 communicates with a pocket or recess 81 in the cylindrical inner bore of the associated one of the bevel gears 23 and 25, each of which pockets or recesses 81 extends from the associated socket 65 in the direction opposite to the direction of rotation of the associated bevel gear relative to the propeller shaft 17.

The transmission 21 also includes an actuator 91 which extends within the axial bore 41 and has a projecting end 93 with an annular groove 95 for receipt of a fork 97 or other suitable mechanism for axially displacing the actuator 91 between axially spaced forward drive, neutral and reverse drive positions.

In addition, the actuator 91 includes (see FIG. 4) a series of angularly spaced axially extending grooves 101 which are equal in number to the number of apertures 49 in each series 45 and 47 and which are circumferentially aligned with the apertures 49.

The grooves 101 are identically formed and each groove 101 includes a raised central portion 103 of increased height as compared to the remainder of the groove. Each of the central portions 103 has opposed forward and rearward ends 105 and 107 spaced axially at a distance less than the axial spacing of the first and second series 45 and 47 of apertures 49. Between the ends 105 and 107, the central portion 103 has a concave cross section transverse to the axis of the propeller shaft 17 with at least a part 109 of such cross section having a common radius equal to the radius of the balls 53. Accordingly, when the central portion 103 is axially aligned with one of the series 45 and 47 of apertures 49, the associated balls 53 will be displaced radially outwardly relative to the apertures 49, while retaining within the associated apertures 49 the ball diameters perpendicular to the radial orientation of the apertures. Such outward radial displacement will locate a portion of the balls 53 outwardly of the propeller shaft sleeve portion 43 and in driving engagement within the associated one of the series 61 and 63 of sockets 65.

It is especially noted that because of the common radius of the ball 53 and the part 109 of the central portion 103 of the grooves 101, that force transmission takes place along a line coextensive with the transverse arcuate length of the part 109 with the common radius, thereby avoiding point contact and thereby providing for lesser pressures and lesser wear.

Extending from the ends 105 and 107 of the central portion of each groove 101 are respective forward and rearward end portions 121 and 123, each of which is depressed relative to the central portion 103 and has a transverse cross sectional dimension permitting receipt thereof of an associated one of the balls 53 so as to permit total withdrawal of the outer portion of the associated ball 53 from the bore of the associated one of the bevel gear 23 and 25, while at the same time, retaining within the associated aperture 49 the ball diameter perpendicular to the radial axis of the aperture. Such radially inward ball displacement disengages rotary drive between the propeller shaft 17 and the associated one of the bevel gears 23 and 25. Such radially outward ball displacement establishes rotary drive between the propeller shaft 17 and the associated one of the bevel gears 23 and 25.

In operation, movement of the actuator 91 to the forward drive position locates the raised central portion 103 in axial alignment with the first series of apertures 45 (and also with the first bevel gear 23) and thereby drivingly engages the first bevel gear 23 with the propeller shaft 17 by reason of outward displacement of the associated balls 53 into the first series of sockets 61. At the same time, the balls 53 associated with the second series of apertures 47 are received into the rearward end portions 123 of the grooves 101, whereby to disengage rotary drive between the propeller shaft 17 and the second bevel gear 25.

When the actuator 91 is in the neutral or center position, the first and second series of apertures 45 and 47 are respectively axially aligned with the forward and rearward end portions 121 and 123 of the grooves 101, whereby to disengage rotary drive between both bevel gears 23 and 25 and the propeller shaft 17 and whereby to locate the central portion 103 of the grooves 101 axially between the first and second series of apertures 45 and 47, respectively.

When the plunger or actuator 91 is moved to the rearward drive position, the raised central portions 103 are located in axial alignment with the second series of apertures 47 (and also with the second bevel gear 25) so as to thereby drivingly engage the second bevel gear 25 with the propeller shaft 17. At the same time, the balls 53 associated with the first series of apertures 45 are received into the forward end portions 121 of the grooves 101, whereby to disengage rotary drive between the propeller shaft 17 and the first bevel gear 23.

Any suitable means well known in the art can be employed to axially shift the actuator or plunger 91 between its forward drive, neutral, and reverse drive positions. If desired, the transmission can be arranged with only a single drive position and a neutral position.

Various of the features of the invention are set forth in the following claims.

I claim:

1. A marine propulsion device comprising a lower unit including a propeller shaft supported in said lower unit against axial movement and for rotary movement relative to said lower unit and including an axial bore extending from one end of said shaft, said axial bore defining an annular wall including first and second axially spaced series of circumferentially spaced cylindrical apertures communicating with said bore and having radially extending axes, a propulsion element fixed on said propeller shaft for common rotation therewith, respective balls in each of said apertures, first and second axially spaced facing bevel gears mounted in said lower unit co-axially with said propeller shaft for rotation relative to said lower unit and said propeller shaft and against axial movement relative to said lower unit and said propeller shaft, said first and second bevel gears including respective axial bores having therein respective first and second series of circumferentially spaced sockets opening radially inwardly and located in axial alignment with said first and second series of apertures in said propeller shaft, and an actuator extending in said axial bore in said propeller shaft and movable between axially spaced forward drive, neutral, and reverse drive positions, said actuator including means for selectively engaging said balls with said bevel gears to selectively establish said device in forward drive, neutral, and reverse drive conditions, said means comprising a series of circumferentially spaced, axially extending grooves in said actuator, each of said grooves including a raised central portion having first and second ends axially spaced at a distance less that the axial spacing of said first and second series of apertures and having, intermediate said ends, a concave cross sectional contour with a part thereof having a common radius equal to that of said balls such that engagement of said part with an associated one of said balls forces the associated ball radially outwardly relative to the associated aperture in said propeller shaft, and into engagement with an associated socket in one of said bevel gears, each of said grooves further including first and second end portions extending respectively from said first and second ends of said central portion, each of said end portions having a cross sectional contour of such dimension as to permit receipt thereinto of an associated ball so as to permit withdrawal of the associated ball from an associated socket, said end portions of said grooves having respective axial extents such that, when said actuator is in said forward drive position, said first series of apertures is axially aligned with said central portions of said grooves and said second series of apertures is axially aligned with said second end portions of said grooves, whereby rotary drive is established between said first bevel gear and said propeller shaft and rotary drive is disengaged between said second bevel gear and said propeller shaft, such that, when said actuator is in said neutral position, said first and second series of apertures are respectively axially aligned with said first and second end portions of said grooves and said central portions of said grooves are located intermediate said first and second series of apertures, whereby both of said bevel gears are disengaged from rotary drive with said propeller shaft, and such that, when said actuator is in said reverse drive position, said second series of apertures is axially aligned with said central portions of said grooves and said first series of apertures is axially aligned with said first end portions of said grooves, whereby rotary drive is established between said second bevel gear and said propeller shaft and rotary drive is disengaged between said first bevel gear and said propeller shaft.

2. A marine propulsion device in accordance with claim 1 wherein said annular wall defines a propeller shaft sleeve portion having a given radial thickness, and wherein said balls have diameters equal to the diameters of said apertures and greater than the radial thickness of said annular wall of said propeller shaft.

3. A marine propulsion device comprising a lower unit including a propeller shaft supported in said lower unit against axial movement and for rotary movement relative to said lower unit and including an axial bore extending from one end of said shaft, said axial bore defining an annular wall providing a propeller shaft sleeve portion having a given radial thickness and first and second axially spaced series of circumferentially spaced cylindrical apertures communicating with said bore and having radially extending axes, a propulsion element fixed on said propeller shaft for common rotation therewith, respective balls in each of said apertures, said balls having diameters equal to the diameters of said apertures and greater than the radial thickness of said sleeve portion of said propeller shaft, first and second axially spaced facing bevel gears mounted in said lower unit co-axially with said propeller shaft for rotation relative to said lower unit and said propeller shaft and against axial movement relative to said lower unit and said propeller shaft, said first and second bevel gears including respective axial bores having first and second series of circumferentially spaced sockets opening radially inwardly and located in axial alignment with said first and second series of apertures in said propeller shaft, and an actuator extending in said axial bore in said propeller shaft and movable between axially spaced forward drive, neutral, and reverse drive positions, said actuator including a series of circumferentially spaced, axially extending grooves, each of said grooves including a raised central portion having first and second ends axially spaced at a distance less than the axial spacing of said first and second series of apertures and having, intermediate said ends, a concave cross sectional contour with a part thereof having a common radius equal to that of said balls such that engagement of said part with an associated one of said balls forces the associated ball radially outwardly relative to the associated aperture in said propeller shaft, and into engagement with an associated socket in one of said bevel gears, each of said grooves further including first and second end portions extending respectively from said first and second ends of said central portion, each of said end portions having a cross sectional contour of such dimension as to permit receipt thereinto of an associated ball so as to permit withdrawal of the associated ball from an associated socket, said end portions of said grooves having respective axial extents such that, when said actuator is in said forward drive position, said first series of apertures is axially aligned with said central portions of said grooves and said second series of apertures is axially aligned with said second end portions of said grooves, whereby rotary drive is established between said first bevel gear and said propeller shaft and rotary drive is disengaged between said second bevel gear and said propeller shaft, such that, when said actuator is in said neutral position, said first and second series of apertures are respectively axially aligned with said first and second end portions of said grooves and said central portions of said grooves are located intermediate said first and second series of apertures, whereby both of said bevel gears are disengaged from rotary drive with said propeller shaft, and such that, when said actuator is in said reverse drive position, said second series of apertures is axially aligned with said central portions of said grooves and said first series of apertures is axially aligned with said first end portions of said grooves, whereby rotary drive is established between said second bevel gear and said propeller shaft and rotary drive is disengaged between said first bevel gear and said propeller shaft.

4. A marine propulsion device in accordance with claim 3 wherein said radial thickness of said sleeve portion of said propeller shaft is greater than the maximum radial displacement of said balls, and wherein said balls each have a diameter extending perpendicularly to the radial axis of said apertures, and wherein said grooves are dimensioned such that said ball diameters are retained in said apertures throughout the extent of the radial movement of said balls.

5. A marine propulsion device in accordance with claim 3 wherein each of said sockets comprises a spherical surface bounded on two sides by intersecting straight lines located in angularly related planes extending through the center of said spherical surface and by an arcuate line connecting said straight lines remotely from the point of intersection.

6. A marine propulsion device in accordance with claim 5 wherein said first and second bores in said first and second bevel gears also include radially inwardly open pockets extending from said sockets in the direction opposite from the direction of rotation of said bevel gears.

7. A marine propulsion device in accordance with claim 5 wherein said intersecting straight lines define an arrow pointed in the direction opposite to the direction of rotation of the associated one of said bevel gears.

8. A marine propulsion device comprising a lower unit including a propeller shaft supported in said lower unit against axial movement and for rotary movement relative to said lower unit and including an axial bore extending from one end of said shaft, said axial bore defining an annular wall including a series of circumferentially spaced cylindrical apertures communicating with said bore and having radially extending axes, a propulsion element fixed on said propeller shaft for common rotation therewith, respective balls in each of said apertures, a bevel gear mounted in said lower unit co-axially with said propeller shaft for rotation relative to said lower unit and said propeller shaft and against axial movement relative to said lower unit and said propeller shaft, said bevel gear including an axial bore having therein a series of circumferentially spaced sockets opening radially inwardly and located in axial alignment with said series of apertures in said propeller shaft, and an actuator extending in said axial bore in said propeller shaft and movable between axially spaced drive and neutral positions, said actuator including means for selectively establishing said device in drive and neutral conditions, said means comprising a series of circumferentially spaced, axially extending grooves in said actuator, each of said grooves including a raised portion having a concave cross sectional contour with a part thereof having a common radius equal to that of said balls such that engagement of said part with an associated one of said balls forces the associated ball radially outwardly relative to the associated aperture in said propeller shaft, and into engagement with an associated socket in said bevel gear, each of said grooves further including an end portion extending from said raised portion, each of said end portions having a cross sectional contour of such dimension as to permit receipt thereinto of an associated ball so as to permit withdrawal of the associated ball from an associated socket, said end portions of said grooves having respective axial extents such that, when said actuator is in said drive position, said series of apertures is axially aligned with said raised portions of said grooves, whereby rotary drive is established between said bevel gear and said propeller shaft, and such that, when said actuator is in said neutral position, said series of apertures is axially aligned with said end portions of said grooves, whereby said bevel gear is disengaged from rotary drive with said propeller shaft.

9. A marine propulsion device comprising a lower unit including a propeller shaft supported in said lower unit against axial movement and for rotary movement relative to said lower unit and including an axial bore extending from one end of said shaft, said axial bore defining an annular wall including an aperture communicating with said bore and having a radially extending axis, a propulsion element fixed on said propeller shaft for common rotation therewith, a ball in said aperture, a bevel gear mounted in said lower unit co-axially with said propeller shaft for rotation relative to said lower unit and said propeller shaft and against axial movement relative to said lower unit and said propeller shaft, said bevel gear including an axial bore having therein a socket opening radially inwardly and located in axial alignment with said aperture in said propeller shaft, and an actuator extending in said axial bore in said propeller shaft and movable between axially spaced drive and neutral positions, said actuator including means for selectively engaging said ball with said bevel gear to selectively establish said device in drive and neutral conditions, said means comprising an axially extending groove located in said actuator and including a raised portion having a concave cross sectional contour with a part thereof having a common radius equal to that of said ball such that engagement of said part with said ball forces said ball radially outwardly relative to said aperture in said propeller shaft and into engagement with said socket in said bevel gear, said groove further including an end portion extending from said raised portion and having a cross sectional contour of such dimension as to permit receipt thereinto of said ball so as to permit withdrawal of said ball from said socket, said end portion of said groove having an axial extent such that, when said actuator is in said drive position, said aperture is axially aligned with said raised portion of said groove, whereby rotary drive is established between said bevel gear and said propeller shaft, and such that, when said actuator is in said neutral position, said aperture is axially aligned with said end portion of said groove, whereby said bevel gear is disengaged from rotary drive with said propeller shaft.

10. A marine propulsion device in accordance with either of claims 8 or 9 wherein said annular wall defines a propeller shaft sleeve portion having a given radial thickness, and wherein said balls have diameters equal to the diameters of said apertures and greater than the radial thickness of said sleeve portion of said propeller shaft.

11. A marine propulsion device in accordance with either of claims 8 or 9 wherein said annular wall defines a propeller shaft sleeve portion having a radial thickness greater than the maximum radial displacement of said balls, and wherein said balls each have a diameter extending perpendicularly to the radial axis of said apertures, and wherein said grooves are dimensioned such that said ball diameters are retained in said apertures throughout the extent of the radial movement of said balls.

12. A marine propulsion device in accordance with either of claims 8 or 9 wherein each of said sockets comprises a spherical surface bounded on two sides by intersecting straight lines located in angularly related planes extending through the center of said spherical surface and by an arcuate line connecting said straight lines remotely from the point of intersection.

13. A marine propulsion device in accordance with claim 12 wherein said first and second bores in said first and second bevel gears also include radially inwardly open pockets extending from said sockets in the direction opposite from the direction of rotation of said bevel gear.

14. A marine propulsion device in accordance with claim 12 wherein said intersecting straight lines define an arrow pointing in the direction opposite to the direction of rotation of said bevel gear.

* * * * *